United States Patent
Cocca

[15] 3,665,307
[45] May 23, 1972

[54] METHOD AND APPARATUS FOR DETECTING SURFACE IONS ON SILICON DIODES AND TRANSISTORS

[72] Inventor: Frank J. Cocca, East Boston, Mass.

[73] Assignee: The United States of America as represented by the National Aeronautics and Space Administration

[22] Filed: June 5, 1970

[21] Appl. No.: 43,884

[52] U.S. Cl. ........................................324/158 D, 324/158 T
[51] Int. Cl. ...............................................................G01r 31/22
[58] Field of Search ...........................324/158, 158 D, 158 T; 317/234, 235

[56] References Cited

UNITED STATES PATENTS

| 3,134,073 | 5/1964 | Dickerson | 324/158 D UX |
| 3,366,879 | 1/1968 | Kobayashi et al | 324/158 |

OTHER PUBLICATIONS

" Reverse Recovery Time Measurements of Epitaxial Silicon P–N Junctions at Low Temperatures" in Solid–State Electronics Pergamon Press 1964 Vol. 7 TK7800S58 pp. 823–830

*Primary Examiner*—Herman Karl Saalbach
*Assistant Examiner*—Marvin Nussbaum
*Attorney*—Russell E. Schlorff and Marvin F. Matthews

[57] ABSTRACT

A method and apparatus for detecting surface ions on silicon diodes and transistors is disclosed. The apparatus disclosed comprises a temperature chamber for housing the diode or transistor under test, a power supply, an ammeter and an X-Y recorder. The semiconductor under test is subjected to various low temperatures and the reverse current-voltage characteristic curves of the semiconductor are plotted at each of the temperatures. From the reverse I-V characteristic curves, the presence of surface ions can be detected.

4 Claims, 7 Drawing Figures

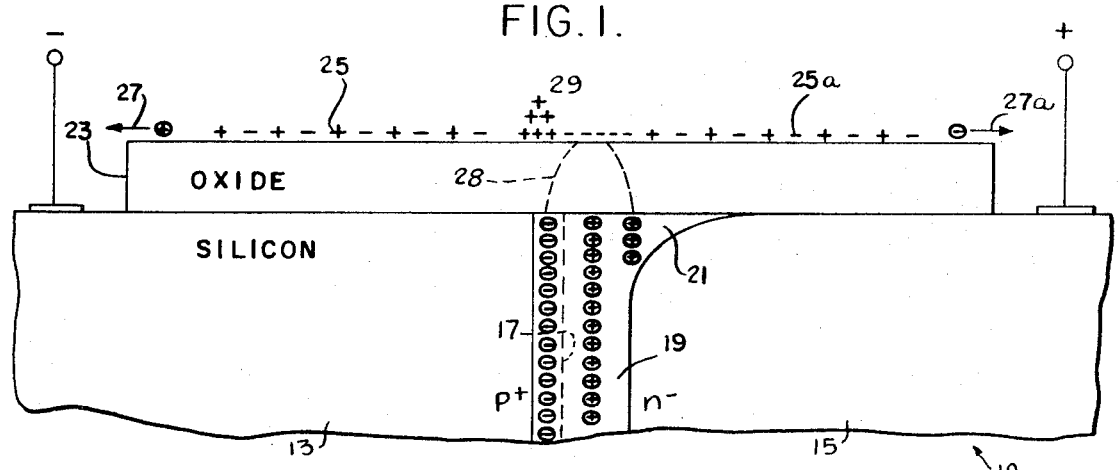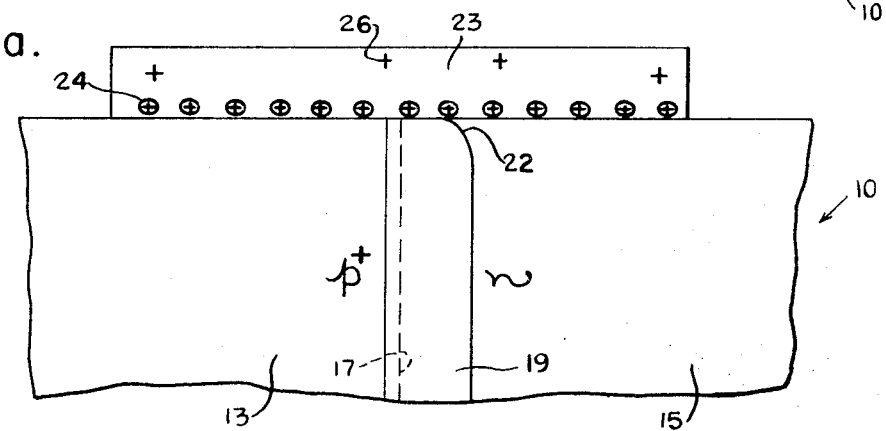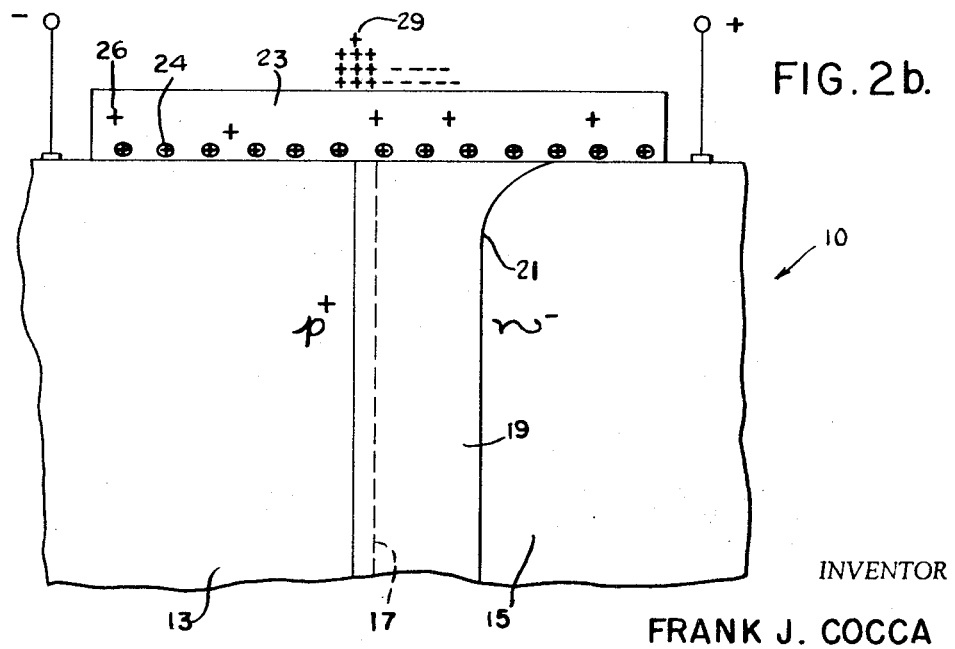
INVENTOR
FRANK J. COCCA
BY Herbert E. Farmer
ATTORNEY INVENTOR
FRANK J. COCCA
BY Herbert E. Farmer
ATTORNEY

METHOD AND APPARATUS FOR DETECTING SURFACE IONS ON SILICON DIODES AND TRANSISTORS

ORIGIN OF THE INVENTION

The invention described herein was made by an employee of the United States Government and may be manufactured and used by or for the Government for governmental purposes without the payment of any royalties thereon or therefor.

BACKGROUND OF THE INVENTION

P-N junctions of planar devices terminate at the silicon surface. The silicon surface is covered with a silicon oxide passivating layer. The silicon oxide passivating layer contains fixed and mobile electrical charges which can alter the electrical characteristic of the P-N junction. Fixed charges are a result of the intrinsic oxide material and their number and position generally do not change with time. These charges are positive and induce a negative charge in the silicon. Mobile charges, on the other hand, are due to contamination during semiconductor processing and their number and position are influenced by the environment. Mobile charges are present in the oxide bulk as well as on the surface of the oxide. Mobile charges in the oxide bulk have been studied extensively. However, mobile charges on the oxide (surface ions) are difficult to study.

Little is known about the chemical nature and behavior of surface ions except that anions and cations are left on the surface during processing and/or may be transferred from the interior of the package to the oxide during electrical operations. Moisture is known to drastically increase the number of surface ions either in itself or due to some kind of interaction with the oxide surface. Surface ions on the oxide of reverse biased P-N junctions contribute to the total leakage current and in time cause P-N junction degradation.

Since the mobile ions are responsible for P-N junction degradation, a method of detecting these ions can serve as a valuable tool to screen potential failures. In addition, a technique for detecting the mobile ions can be used as a process control tool for the manufacture of planar devices and as a laboratory test vehicle to study surface ions behavior.

SUMMARY OF THE INVENTION

The present invention provides a method and the apparatus for detecting surface ions on silicon diodes and transistors. With this invention silicon diodes and transistors can be screened to cull out potential failures due to P-N junction degradation caused by surface ions. In addition, the invention can be used as a process control tool for the manufacture of planar devices and as a laboratory test vehicle to study surface ion behavior.

It is therefore an object of this invention to provide a method for detecting surface ions on planar devices.

Another object of this invention is to detect surface ions on planar devices by low temperature I-V characteristic measurements.

A further object of this invention is to provide the apparatus for the detection of surface ions on planar devices.

BRIEF DESCRIPTION OF THE DRAWING

The above mentioned and other objects of the invention will become readily apparent from the following detailed description of the invention when read in conjunction with the annexed drawing in which:

FIG. 1 is a pictorial representation of the behavior of surface ions on a reverse biased P+N− junction device;

FIG. 2a is a pictorial representation of the influence of oxide positive charges on the depletion region of a reverse biased P+N− junction device;

FIG. 2b is a pictorial representation of the influence of surface ions on the depletion region of a reverse biased P+N− junction device;

DESCRIPTION OF THE INVENTION

Figure 3:
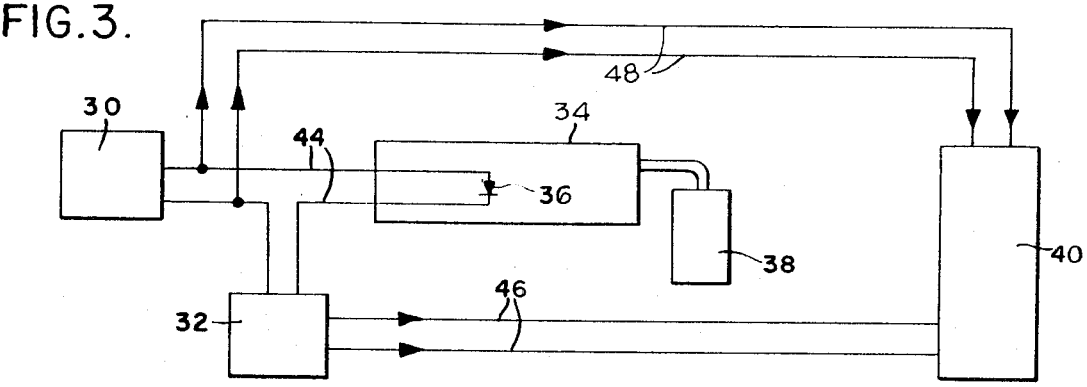
FIG. 3 is a block diagram of the apparatus used to carry out the invention.

FIGS. 1, 2a and 2b show the behavior and influence of surface ions on reverse biased P-N junction devices. Before discussing and describing a preferred embodiment of the invention, a description of the influence and behavior of surface ions will be given since an understanding of the action of these ions will, it is believed, give a clearer understanding of all the aspects of the invention.

Referring to FIG. 1, a silicon P-N junction diode 10 having a P region 13 and an N region 15 is shown. The P and N regions are separated by a metallurgical junction 17 and a depletion region 19. Negative charges are shown between the P region 13 and the junction 17 and positive charges are shown in the depletion region 19. A passivating layer of silicon oxide 23 is shown on top of the silicon. Surface ions 25 and 25a are shown on top of the oxide 23 and the direction of drift of the surface ions is indicated by the arrows 27 and 27a. As shown in FIG. 1, these surface ions tend to pile up over the junction 17 and depletion region 19. This pile up of surface ions 29 is due to the reverse biased fringing field indicated by the dashed line 28. When the accumulation of ionic charges on the oxide 23 is sufficient, it will tend to deplete the underlying silicon exposing more carrier generation sites causing an increase in channel leakage current. This is generally indicated by the numeral 21 in FIG. 1. The depletion of the underlying silicon also results in an increase in breakdown voltage because of a reduction in the electric field strength at the silicon surface. This allows the P-N junction to break down at a higher voltage in the bulk silicon.

While FIG. 1 has shown only surface ions, mobile ions are also contained in the bulk of the silicon oxide passivating layer 23. The mobile surface ions and bulk ions are the result of contamination during semiconductor processing and their number and position are influenced by the environment. In addition to the mobile ions, fixed charges are also present in the oxide material. These fixed charges are a result of the intrinsic oxide material and their number and position generally do not change with time. FIG. 2a shows the fixed charges 24 and the mobile charges 26 in the oxide bulk 23 and FIG. 2b shows the fixed charges 24, the mobile charges 26 in the bulk of the oxide and the surface ions 29 on the oxide surface.

FIG. 2a shows the effect of the fixed and mobile charges in the oxide bulk on the depletion region. As was the case in FIG. 1, FIG. 2a shows a silicon planar device 10 having a P+ region 13 and an N− region 15. The P-N regions are separated by a metallurgical junction 17 and a depletion region 19. The silicon is covered by a silicon oxide passivating layer 23. The oxide layer 23 contains positive fixed charges 24 and positive mobile charges 26. Since the device under consideration is a P+N− junction device, the positive charges in oxide layer 23 tend to accumulate an N− type region thereby narrowing the depletion region 19 of the reverse biased P-N junction. This is generally indicated by the numeral 22. Narrowing the depletion region 19 increases the reverse biased field at the silicon surface and allows the junctions to break down at a lower voltage than if there were no charges present. This effect also decreases the reverse current.

The effect of the fixed and mobile charges in the oxide bulk has been thoroughly investigated using relatively standardized techniques. Surface ions on the other hand are not easily investigated by any of the known prior art methods. Referring specifically to FIG. 2b, a silicon planar device 10 having a P+ region 13 and an N— region 15 is shown. As before, P region 13 and N region 15 are separated by metallurgical junction 17 and a depletion region 19. The silicon surface is covered by a passivating silicon oxide layer 23. As shown in FIG. 2b, the bulk oxide contains positive fixed charges 24 and positive mobile charges 26. The surface of oxide layer 23 contains positive and negative surface ions indicated by the numeral 29. Surface ions 29 tend to build up at the fringing field of the reverse biased P-N junction. The fringing field is shown in FIG. 1 by the numeral 28. Surface ions 29 build up in such a manner as to oppose the field induced by the positive oxide charges. As was shown and discussed with reference to FIG. 1, and is more clearly shown in FIG. 2b, when enough surface charges are present, they will deplete the surface of the n type silicon over a large area. This is generally indicated by the numeral 21. This depletion effect tends to increase the breakdown voltage because of the lower electric field at the silicon surface and allows the P-N junction to break down in the bulk. The widening of the depletion region will also increase the reverse current. The foregoing charge induction analysis can also be applied to an N+P— junction in a similar manner.

As has been mentioned above, satisfactory methods have been devised for studying and investigating the effects of the fixed and mobile charges in the oxide bulk. However, prior to this invention no satisfactory method has been devised for investigating and measuring the mobile ions present on the surface of a silicon planar device. This invention, which utilizes low temperature techniques, provides the apparatus and a method for investigating and detecting surface ions on silicon diodes and transistors. Therefore, this invention provides a valuable tool for screening potential failures since it has been mentioned above that surface ions are known to be responsible for P-N junction degradation. In addition, this invention can be used as a process control tool for the manufacture of planar devices and as a laboratory test vehicle to study surface ion behavior.

Referring now to FIG. 4 which shows the apparatus of this invention, a temperature chamber 34 has a P-N junction diode 36 housed therein. A tank 38 containing liquid nitrogen is connected to the chamber 34. The liquid nitrogen is used to obtain low temperatures in the temperature chamber 34. The output of a power supply 30 is connected across the diode 36 by means of the electrical conductors 44 and the X-axis of an X-Y recorder 40 is also connected across the diode 36 by means of the electrical conductors 48. An ammeter 32 is connected in series with the power supply 30 and the diode 36. An output from the ammeter 32 is connected to the Y-axis of the X-Y recorder 40 by means of the electrical conductors 46. This apparatus is utilized to obtain reverse biased current-voltage characteristic curves of the device under test. The I-V characteristic curves are obtained at low temperatures. That is, the temperature chamber is maintained at a low temperature in the range of $-25°$ to $-75°$ C. or colder. These low temperatures are maintained because it is believed that the surface ions become less mobile at these lower temperatures and tend to remain piled up over the reverse biased fringe field area. The I-V characteristic curves may be obtained at various temperatures including room temperature for comparison and analysis purposes.

Figure 4A:
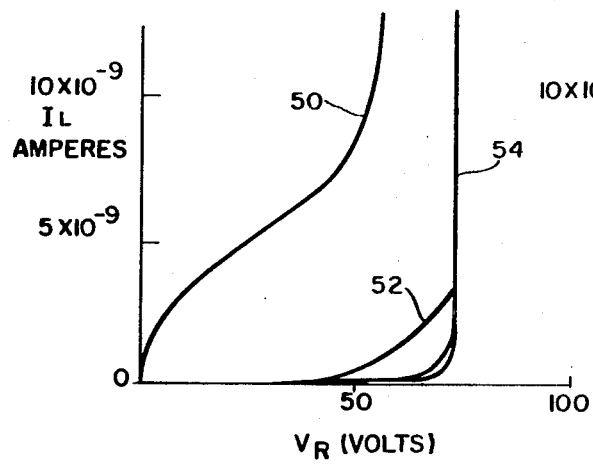
FIG. 4a shows the reverse I-V characteristic curve of what can be considered an ideal P-N junction diode for three different temperatures.
Figure 4B:
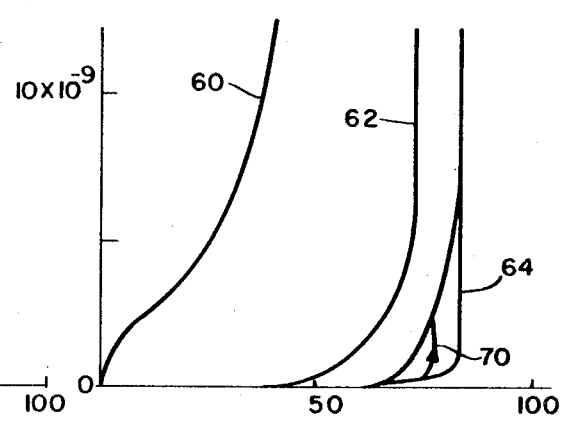
FIG. 4b shows the reverse I-V characteristic curve taken at three different temperatures for a non-ideal P-N junction diode.

The reverse biased I-V curves for several P-N junction diodes were obtained utilizing the apparatus of FIG. 3. Characteristic curves were obtained at room temperature, at $-25°$ C. and at $-75°$ C. The I-V curves for two of the diodes tested are shown in FIGS. 4a and 4b. In the graphs of FIGS. 4a and 4b the X axis represents reverse voltage ($V_R$) and the Y-axis represents leakage current ($I_L$). The curves of FIG. 4a are those of what can be considered to be an ideal diode taken at the above three noted temperatures and the curves of FIG. 4b are those of a non-ideal diode taken at the same temperatures. Specifically, in FIG. 4a the curve 50 was obtained at room temperature, the curve 52 was obtained at $-25°$ C. and the curve 54 was obtained at $-75°$ C. Similarly, in the case of a non-ideal diode, FIG. 4b, the curve 60 was obtained at room temperature, the curve 62 was obtained at $-25°$ C. and the curve 64 was obtained at $-75°$ C. The diodes tested were 1N3605 diodes. Comparing curve 50 of FIG. 4a with curve 60 of FIG. 4b, it is obvious that the leakage current is higher for the non-ideal case of FIG. 4b. However, for the diodes utilized (1N3605) both curves are well within reverse current specifications.

In the non-ideal case, FIG.4b, the breakdown voltage (knee of the curve) is increased by approximately 10 volts when the temperature is lowered from $-25°$ to $-75°$ C. This is clearly shown in FIG. 4b. On the other hand, inspection of FIG. 4a (ideal diode) shows that no change in breakdown voltage occurred for the same temperature excursion.

Figure 5A:
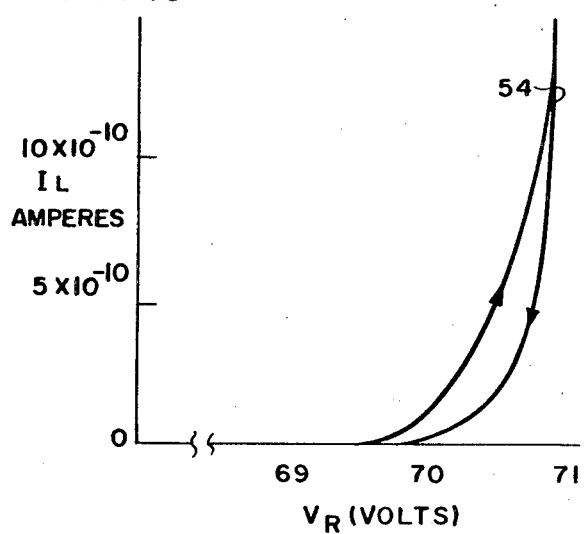
FIG. 5a shows one of the curves of FIG. 4a on an expanded scale.
Figure 5B:
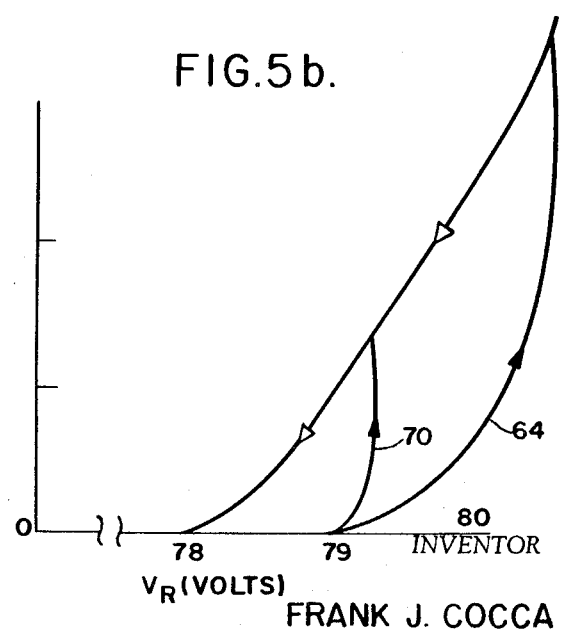
FIG. 5b shows one of the curves of FIG. 4b on an expanded scale.

A closer inspection of the I-V characteristics at $-75°$ C., curve 54 in FIG. 4a and curve 64 in FIG. 4b, reveals two types of hysteresis, i.e., one clockwise and the other counterclockwise. This is more clearly illustrated in FIGS. 5a and 5b. FIG. 5a shows curve 54 of FIG. 4a on an expanded scale. And FIG. 5b shows curve 64 of FIG. 4b on an expanded scale. In FIG. 5a the hysteresis is clockwise. It is believed that this clockwise hysteresis is due to instrumentation and/or filling and emptying of surface traps. On the other hand, the counterclockwise hysteresis of FIG. 5b is completely dominated by the inner action of surface ions with the underlying silicon. Another factor noted from a close inspection of FIG. 5b is that the leakage current increases at constant reverse voltage. This is indicated by the curve 70.

A total of 16 1N3605 diodes were tested utilizing the apparatus of FIG. 3. Ten of the 16 diodes tested exhibited ideal characteristic curves, that is, curves similar to FIG. 4a and six of the diodes exhibited non-ideal characteristic curves similar to those shown in FIG. 4b. These sixteen diodes were then put on a life test at $+175°$ C. and 40 volts reverse bias. After 1 week the diodes exhibiting the non-ideal characteristic curves showed positive degradation while the ideal diodes remained unchanged. These life tests were utilized as a check on the method and apparatus of this invention. Clearly the results of the life tests indicate that the method and apparatus of this invention can be utilized to detect surface ions on P-N planar devices.

From the foregoing detailed description, it is obvious that this invention provides a means to detect surface ions. Therefore, this invention can serve as a valuable tool to screen potential failures since surface ions are known to be responsible for P-N junction degradation. Furthermore, the invention can also be utilized as a process control tool for the manufacture of planar devices and as a laboratory test vehicle to study surface ion behavior.

While the invention has been described with reference to a specific embodiment, it will be obvious to those skilled in the art that various modifications and changes can be made to the described embodiment without departing from the spirit and scope of the invention as set forth in the claims.

What is claimed is:

1. An apparatus for detecting surface ions on P-N planar junction devices comprising:
   a. temperature control chamber means for housing said junction device and for maintaining the ambient temperature of said junction device at a selected discrete temperature in the range of $-25°$ to $-75°$ C., said temperature control means being adaptable to adjust and maintain the ambient temperature of said junction device at different discrete temperatures in said range;
   b. means for applying and varying reverse bias voltages in the range of 0 to 100 volts d.c. to the junction device while said device is maintained at a discrete temperature;
   c. current sensing means electrically connected to the junction device for quantitatively indicating current flowing through said junction device; and
   d. means electrically connected to said bias voltage means and to said current sensing means for plotting a current-versus-voltage characteristic curve of the junction device for increasing and decreasing bias voltage while said device is maintained at each said discrete temperature whereby currentnversus-voltage characteristic curves indicating hysteresis are obtainable.

2. A method for detecting surface ions on P-N junction planar devices comprising the steps of:
   a. maintaining said junction device at a selected discrete temperature in the approximate range of −25° to −75° C.;
   b. applying a reverse bias voltage to said junction device;
   c. varying said bias voltage over the approximate range of 0 to 100 volts d.c. in both increasing and decreasing directions to thereby obtain a hysteresis curve;
   d. plotting a current-versus-voltage characteristic hysteresis curve for each discrete temperature selected; and
   e. examining the characteristic hysteresis curves of the junction device to detect differences in the hysteresis effects demonstrated therein as indicating the presence of surface ions.

3. A method as recited in claim 2 further including repeating each of the steps therein for different discrete temperatures of said junction device within said temperature range to thereby obtain a family of current-versus-voltage characteristic curves.

4. A method for detecting surface ions on a P-N junction planar device comprising the steps of:
   a. maintaining said junction device at a selected discrete temperature in the approximate temperature range of −25° to −75° C.;
   b. applying a reverse bias d.c. voltage to said junction device;
   c. plotting a reverse bias, current-versus-voltage characteristic curve of the junction device at said discrete temperature while varying said reverse bias voltage within an approximate range of 0 to 100 volts d.c. in a manner whereby a current-versus-voltage characteristic curve indicating hysteresis is obtainable;
   d. repeating each of the steps above for different discrete temperatures of said junction device within said temperature range to thereby obtain a family of current-versus-voltage characteristic curves; and
   e. detecting a counter-clockwise hysteresis effect in said curves or detecting an increase in bias voltage for a lower one of said discrete temperatures in order to maintain a constant leakage current as being indicative of the presence of surface ions on said junction device.

* * * * *